(12) United States Patent
Prodic et al.

(10) Patent No.: US 8,482,271 B2
(45) Date of Patent: Jul. 9, 2013

(54) SWITCHING POWER SUPPLY WITH INDUCTOR CURRENT DETECTION STORAGE

(75) Inventors: Aleksandar Prodic, Ontario (CA); Jurgen Alico, Ontario (CA)

(73) Assignee: Kabushiki Kaisha Toshiba, Tokyo (JP)

( * ) Notice: Subject to any disclaimer, the term of this patent is extended or adjusted under 35 U.S.C. 154(b) by 373 days.

(21) Appl. No.: 12/886,706

(22) Filed: Sep. 21, 2010

(65) Prior Publication Data

US 2011/0204859 A1   Aug. 25, 2011

(30) Foreign Application Priority Data

Feb. 19, 2010   (JP) .................................. 2010-34925

(51) Int. Cl.
*G05F 1/575*   (2006.01)
(52) U.S. Cl.
USPC .......................................... 323/285; 323/283
(58) Field of Classification Search
USPC .......................................... 323/283, 285, 290
See application file for complete search history.

(56) References Cited

U.S. PATENT DOCUMENTS

| 6,940,261 | B1* | 9/2005 | Umminger | 323/282 |
| 6,977,492 | B2 | 12/2005 | Sutardja et al. | |
| 7,557,554 | B2* | 7/2009 | Chang | 323/284 |
| 2009/0267582 | A1 | 10/2009 | Prodic et al. | |

FOREIGN PATENT DOCUMENTS

JP   2006-262654 A   9/2006

* cited by examiner

*Primary Examiner* — Harry Behm
(74) *Attorney, Agent, or Firm* — Turocy & Watson, LLP

(57) ABSTRACT

A switching power supply apparatus has a power circuit unit, the power circuit unit including a first switching element connected at a first end to a first end of a power supply, an inductor connected at a first end thereof to a second end of the first switching element, a second output terminal connected to a second end of the inductor, a capacitor connected between a first output terminal and the second output terminal, and a second switching element connected between a second end of the power supply and a second end of the first switching element. The switching power supply apparatus has an optimal response multi-mode digital current program mode control unit, the optimal response multi-mode digital current program mode control unit including an error signal generator which generates an error signal according to a potential difference between an output voltage and a preset voltage, and an inductor current detector which detects and amplifies an inductor current.

18 Claims, 8 Drawing Sheets

SWITCHING POWER SUPPLY WITH INDUCTOR CURRENT DETECTION STORAGE

CROSS-REFERENCE TO RELATED APPLICATION

This application is based upon and claims the benefit of priority from the prior Japanese Patent Application No. 2010-34925, filed on Feb. 19, 2010, the entire contents of which are incorporated herein by reference.

BACKGROUND

1. Field

Embodiments described herein relate generally to a switching power supply apparatus.

2. Background Art

Conventionally, the switching power supply apparatus has been widely utilized for a reason of its high power processing efficiency. The switching power supply apparatus is a power supply apparatus including a switching element, a smoothing circuit formed of an inductor and a capacitor, and a feedback control circuit for keeping an output power supply voltage constant. As for its operation, a smoothing circuit smoothes a rectangular wave obtained by connecting a high potential terminal and a low potential terminal of a supply source alternately by means of the switching element, and an output power supply having a voltage, which is different from that of the supply source is obtained. The switching element assumes extremely low resistance when it is in the on-state, whereas the switching element assumes extremely high resistance when it is in the off-state. In both cases, power dissipation in the switching element is very low. In addition, ideally, the inductor and capacitor do not dissipate power in their charging and discharging operation. Therefore, the switching power supply apparatus has a feature that the power dissipation is low.

As for the feedback control circuit in the switching power supply apparatus, either a voltage feedback control mode or a current program mode is mainly used (see, for example, U.S. Patent Application No. 2009/0267582).

The voltage feedback control mode is a voltage feedback pulse-width modulation mode in which a voltage of an output power supply is measured and a time ratio between the on-state and off-state of the switching element is changed according to a difference between the measured voltage and a reference potential. As a matter of fact, however, a significant transfer delay is caused in the smoothing circuit formed of the inductor and capacitor in the operation of the voltage feedback control mode. Therefore, it is difficult to stabilize the control operation.

On the other hand, in the current program mode controls, the peak of inductor current in which a current flowing through an inductor is measured and the switching element is kept in the on-state until the inductor current reaches a certain target value and then the switching element is brought into the off-state. The target value of the inductor current used here is calculated from a difference between a voltage of the output power supply and a reference potential. Its feedback control becomes a double-loop structure and is complicated. However, the delay in the smoothing circuit, which poses a problem in voltage-mode controllers, is significantly reduced in the current program mode. Therefore, it is comparatively easy to stabilize its control operation.

As an important characteristic in the switching power supply apparatus, there is a transitional response characteristic (also known as transient response) which appears in the case where the load current has changed remarkably and rapidly. If the transitional response characteristic is slow, then a phenomenon that the output voltage becomes low in a moment occurs, for example, when a state in which the load current is small has abruptly changed to a state in which the load current is large. Conversely, when a state in which the load current is large has abruptly changed to a state in which the load current is small, the output voltage rises in a moment.

In the voltage feedback control mode, nonlinear control is frequently used. In the nonlinear control, a difference between the output voltage and the preset voltage caused by a change of the load current is detected and the on-time of the switching element is prolonged extremely to cancel the difference. In the current program mode, however, it is difficult to adopt the nonlinear control, therefore the transitional response characteristic obtained when the load current has varied often poses a problem especially in the switching power supply apparatus using the current program mode.

In this way, the switching power supply apparatus using the conventional voltage feedback control mode has a problem that it is difficult to ensure the stability. Furthermore, in the switching power supply apparatus using the conventional voltage feedback control mode, parallel operation is challenging to achieve and it is difficult to shrink the size of the apparatus and reduce the cost of the apparatus. In addition, problems with non-equal current sharing between phases, causing potential component failures is quite common.

On the other hand, in the switching power supply apparatus using the conventional current program mode, which is an improved type for the switching power supply apparatus using the conventional voltage feedback control mode, there is a problem that it is difficult to improve the transitional response characteristic.

DETAILED DESCRIPTION

A switching power supply apparatus according to an embodiment, includes a power circuit unit, the power circuit unit including a first switching element connected at a first end to a first end of a power supply, an inductor connected at a first end thereof to a second end of the first switching element, a second output terminal connected to a second end of the inductor, a capacitor connected between a first output terminal and the second output terminal, and a second switching element connected between a second end of the power supply and a second end of the first switching element.

The switching power supply apparatus further includes: an optimal response multi-mode digital current program mode control unit, the optimal response multi-mode digital current program mode control unit including an error signal generator which generates an error signal according to a potential difference between an output voltage and a preset voltage (also known as reference), and an inductor current detector which detects and amplifies an inductor current.

The optimal response multi-mode digital current program mode control unit includes: a mode detector which detects an abrupt change of the output voltage and switches an operation mode; a peak/valley detector & optimal current difference calculator which detects an extreme value of the output voltage and calculates a charge quantity lost by the capacitor; and an inductor current detection storage circuit which detects and stores an inductor current value obtained when an extreme (for example, peak or valley) value of the output voltage is detected.

The optimal response multi-mode digital current program mode control unit exercises on-off control of the first switching element or the second switching element according to control of the mode detector, the peak/valley detector & optimal current difference calculator, and the inductor current detection storage circuit.

Hereafter, embodiments of the present invention will be described with reference to the drawings.

First Embodiment

Figure 1:
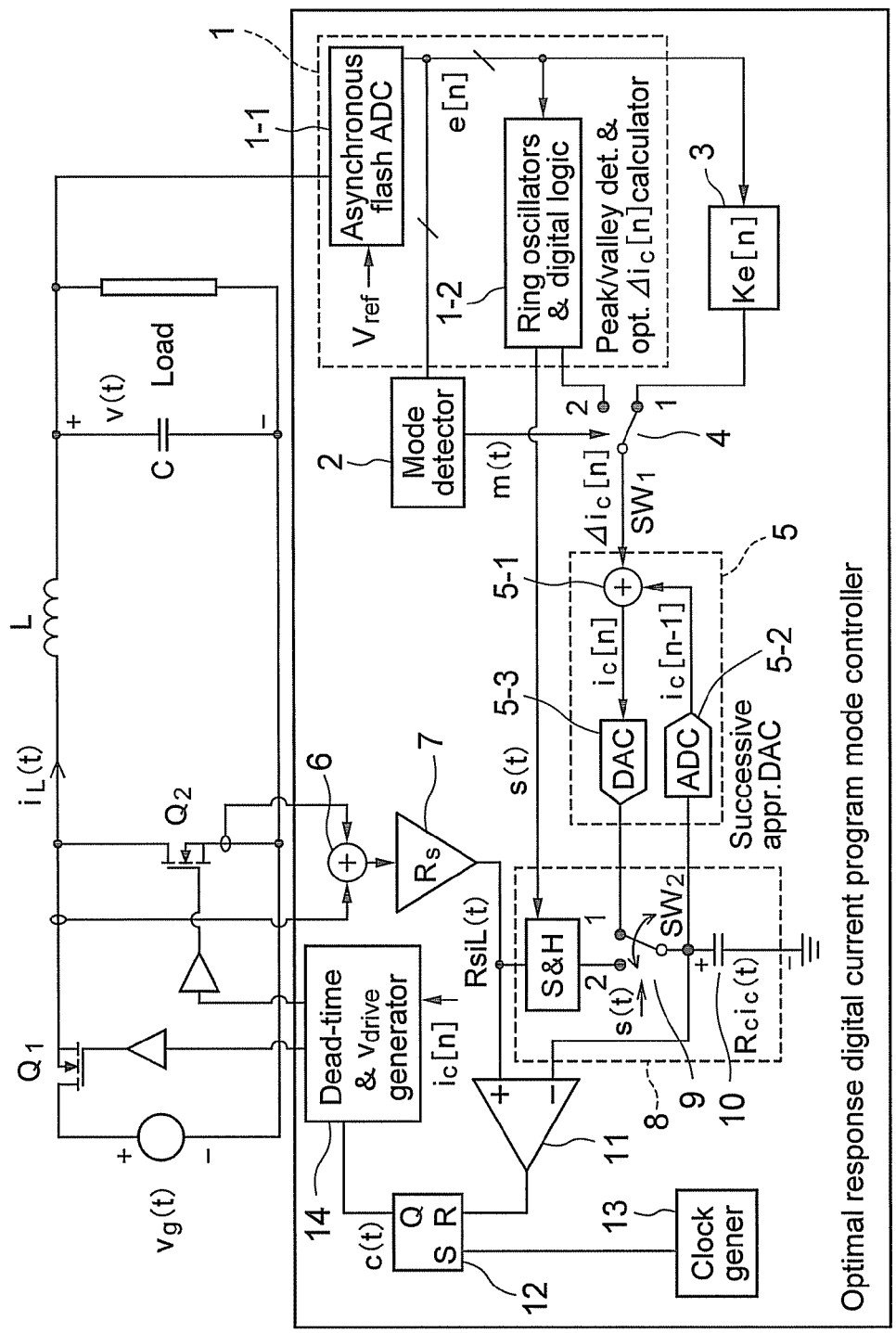
FIG. 1 is a block diagram showing the switching power supply apparatus.
Figure 2:
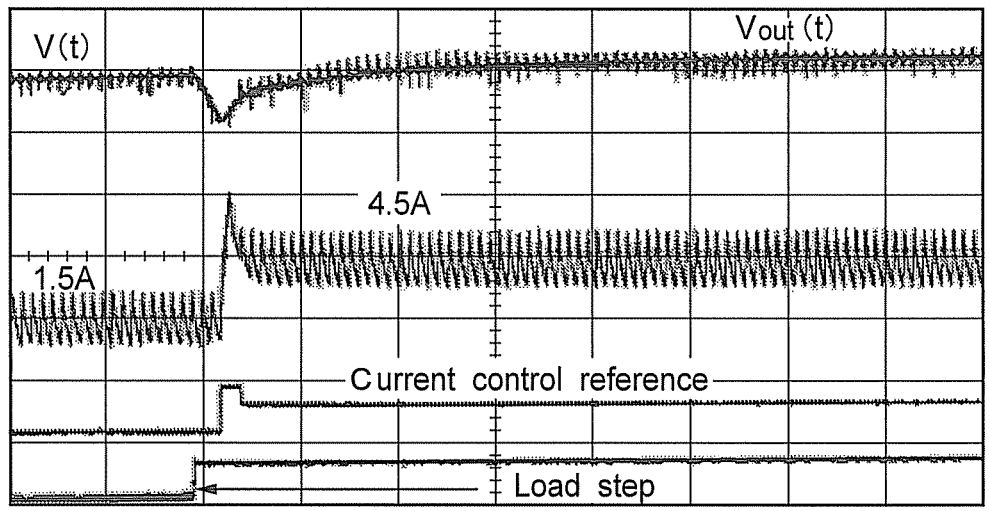
FIG. 2 is a waveform diagram of optimal transient response operation in the actual switching power supply apparatus according to the first embodiment.
Figure 3:
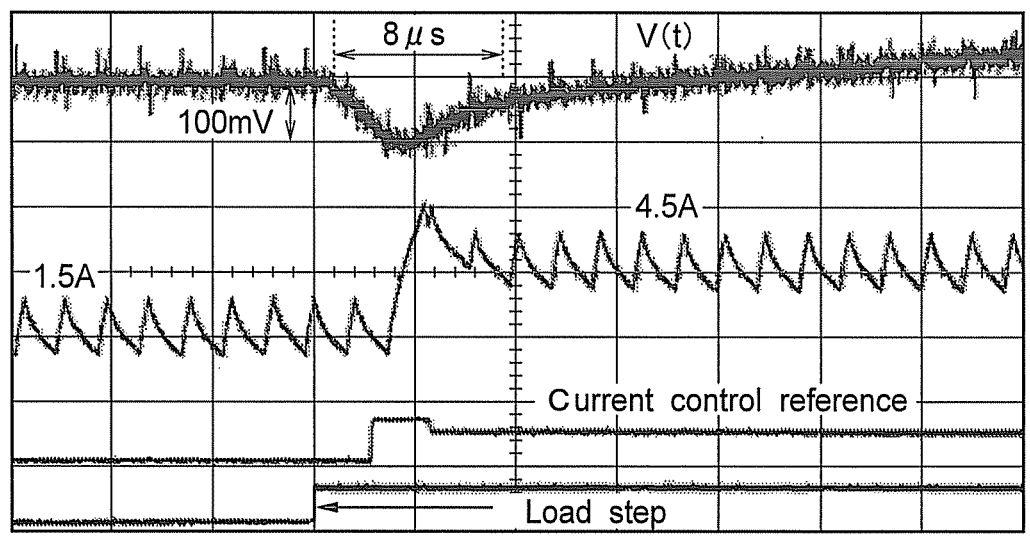
FIG. 3 is a zoomed in version of the waveform diagram of FIG. 2 with the time axis expanded.
Figure 4:
FIG. 4 is a waveform diagram of a pulse frequency control operation in a low load state in the actual switching power supply apparatus according to the first embodiment.

First, a switching power supply apparatus (DC-DC converter) according to a first embodiment of the present invention will now be described with reference to the drawings. FIG. 1 is a block diagram showing the switching power supply apparatus. FIG. 2 is a waveform diagram of optimal transient response operation in the actual switching power supply apparatus according to the first embodiment. FIG. 3 is a waveform diagram with a time axis in FIG. 2 expanded. FIG. 4 is a waveform diagram of a pulse frequency control operation in a low load state in the actual switching power supply apparatus according to the first embodiment.

The switching power supply apparatus according to the present embodiment is a DC voltage step-down power supply which operates by using an optimal response multi-mode digital current program mode controller having a self-aligning function.

As shown in FIG. 1, the switching power supply apparatus includes an optimal response multi-mode digital current program mode control unit and a power circuit unit, which operates in response to a signal supplied from the optimal response multi-mode digital current program mode control unit. The switching power supply control apparatus for controlling the power circuit unit includes the optimal response multi-mode digital current program mode control unit. In this embodiment, for example, the switching power supply control apparatus is equal to the optimal response multi-mode digital current program mode control unit.

The power circuit unit includes a first switching element (MOS transistor) Q1, a second switching element (MOS transistor) Q2, an inductor L and a capacitor C. A high potential terminal + of an external input power supply $v_g(t)$ is connected to a first terminal of the first switching element Q1, and a low potential terminal − of the external input power supply $v_g(t)$ is connected to a first terminal of the second switching element Q2. A second terminal of the first switching element Q1 and a second terminal of the second switching element Q2 are connected to each other, and connected in common to a first terminal of the inductor L. A second terminal of the inductor L becomes a high potential output terminal + of the DC voltage step-down power supply. The low potential terminal − of the external input power supply $v_g(t)$ becomes a low potential output terminal − of the DC voltage step-down power supply. The capacitor C is connected between the high potential output terminal + and the low potential output terminal − of the DC voltage stepdown power supply. A load is also connected between the high potential output terminal + and the low potential output terminal − of the DC voltage step-down power supply.

Switching signals, which are output from the optimal response multi-mode digital current program mode control unit are coupled to gate terminals of the first switching element Q1 and the second switching element Q2 via digital buffer circuits, respectively. Furthermore, in this embodiment, a sum of a current which flows through the first switching element Q1 and a current which flows through the second switching element Q2 and an output voltage of the DC voltage stepdown power supply are always monitored by the optimal response multi-mode digital current program mode control unit.

When forming a current detection circuit, there is a problem to be solved. Conventionally, means for detecting a current which flows through the inductor has been adopted. Since a delay is caused in the detected current value because of influence of parasitic capacitance of the inductor, however, it is not optimal to use the means for detecting the current which flows through the inductor in the peak current control mode. In the peak current control mode, therefore, it is demanded to detect the current which flows through the first switching element Q1. However, the current becomes discontinuous, and an amplifier is required to have a bandwidth which is so high that implementation is difficult, to detect such a current. In the present embodiment, this problem is solved by using means which adds the current flowing through the first switching element Q1 and the current flowing through the second switching element Q2 and amplifies a result of the addition. In other words, the discontinuous inductor current is reconstructed to have a continuous state and the demand for the bandwidth upon an inductor current amplifier 7 in the current detection circuit is relaxed.

The optimal response multi-mode digital current program mode control unit is a principal part in the present embodiment, and it includes a peak/valley detector & optimal $\Delta i_c[n]$ calculator 1, a mode detector 2, an error multiplier 3, a first mode switch 4, a successive approximation DA converter 5, an inductor current adder 6, the inductor current amplifier 7, an inductor current sample and hold circuit 8, a second mode switch 9, an optimal current value retaining capacitor 10, a differential amplifier 11, an SR latch 12, a clock generator 13, and a dead time & $V_{drive}$ generator 14.

Incidentally, the peak/valley detector & optimal $\Delta i_c[n]$ calculator 1, the mode detector 2, the error multiplier 3, and the first mode switch 4 configure an output potential monitor. Furthermore, the inductor current adder 6, the inductor current amplifier 7, the inductor current sample and hold circuit 8, the second mode switch 9, and the optimal current value retaining capacitor 10 form an inductor current detection storage circuit.

In this embodiment, the high potential output terminal + of the DC voltage stepdown power supply becomes an input of an asynchronous flash analog-digital converter 1-1 included in the peak/valley detector & optimal $\Delta i_c[n]$ calculator 1.

The asynchronous flash analog-digital converter 1-1 compares a potential at the high potential output terminal + of the DC voltage stepdown power supply with a given reference voltage $V_{ref}$, and outputs a deviation quantity from the preset potential, i.e., an error signal e[n]. A ring oscillators & digital logic circuit 1-2, which is a principal part of the peak/valley detector & optimal $\Delta i_c[n]$ calculator 1, generates a peak/valley detection signal s(t) and an optimal peak current difference signal $\Delta i_c[n]$ based on the error signal e[n]. The error signal e[n] is supplied to the mode detector 2 and the error multiplier 3.

The mode detector 2 outputs a mode changeover signal m(t) based on magnitude of the error signal e[n]. The first mode switch 4 (sw1) selects either an output Ke[n] of the error multiplier 3 or an output of the peak/valley detector & optimal $\Delta i_c[n]$ calculator 1 according to an order of the mode changeover signal m(t), and calculates the latest optimal peak current difference signal $\Delta i_c[n]$. The optimal peak current difference signal $\Delta i_c[n]$ is input to an output adder 5-1 included in the successive approximation DA converter 5.

The output adder 5-1 adds together the optimal peak current difference signal $\Delta i_c[n]$ and an optimal peak current signal $i_c[n-1]$ of the last time, which is output from an output analog-digital converter 5-2, and calculates the present optimal peak current signal $i_c[n]$. The calculated latest optimal peak current signal $i_c[n]$ is converted to an analog signal voltage signal $R_c i_c(t)$ by an output digital-analog converter 5-3, and the analog signal voltage signal $R_c i_c(t)$ is output from the successive approximation DA converter 5.

On the other hand, detected signals respectively corresponding to the current which flows through the first switching element Q1 and the current which flows through the second switching element Q2 are added together by the inductor current adder 6 to produce an analog signal $i_L(t)$ which represents an inductor current. The inductor current signal $i_L(t)$ is amplified to $R_s$ times by the inductor current amplifier 7 to produce an inductor current signal $R_s i_L(t)$. The inductor current signal $R_s i_L(t)$ is taken into and retained by the inductor current sample and hold circuit 8 according to an order of the peak/valley detection signal s(t), which is output from the peak/valley detector & optimal $\Delta i_c[n]$ calculator 1.

The second mode switch 9 selects and outputs either the inductor current signal $R_s i_L(t)$ which is output from the inductor current sample and hold circuit 8 or the output signal $R_c i_c(t)$ of the successive approximation DA converter 5 according to the order of the peak/valley detection signal s(t). The selected output signal is stored across the optimal current value retaining capacitor 10 as the latest optimal peak current value $R_c i_c(t)$. The optimal peak current value $R_c i_c(t)$ stored across the optimal current value retaining capacitor 10 is supplied to the output analog-digital converter 5-2.

The output analog-digital converter 5-2 converts the analog signal $R_c i_c(t)$, which indicates the optimal peak current value, to a digital signal. The digital signal of the optimal peak current value is referred to in the next cycle as the last optimal peak current value $i_c[n-1]$.

The measured inductor current signal $R_s i_L(t)$ is input to a non-inverting input terminal + of the differential amplifier 11, whereas the optimal peak current value $R_c i_c(t)$ is input to an inverting input terminal − of the differential amplifier 11. When the inductor current signal $R_s i_L(t)$ has reached the optimal peak current value $R_c i_c(t)$, the differential amplifier 11 outputs a reset signal R.

The reset signal R is coupled to a reset terminal R of the SR latch 12. A clock signal generated by the clock generator 13 is coupled to a set terminal of the SR latch 12. The SR latch 12 receives the set signal S and the reset signal R, and outputs a control signal c(t). The dead time & $V_{drive}$ generator 14 is supplied with the control signal c(t), and outputs drive signals which control on/off of the first switching element Q1 and the second switching element Q2. At this time, the dead time & $V_{drive}$ generator 14 conducts optimization of a time period over which both the first switching element Q1 and the second switching element Q2 are turned off, i.e., adjustment of the dead time based on the optimal peak current signal $i_c[n]$ in the successive approximation DA converter 5.

The dead time & $V_{drive}$ generator 14 converts a voltage (not illustrated) of a power supply supplied to the optimal response multi-mode digital current program mode control unit to a voltage $V_g(t)$ of a power supply supplied to the power circuit unit, and then outputs the drive signals.

The switching power supply apparatus having a configuration described heretofore conducts two different operations according to the magnitude of the load current. When the load current is great in the steady state, the switching power supply apparatus conducts a current program type pulse-width modulation operation. When the load current is small in the steady state, the switching power supply apparatus conducts a pulse-frequency modulation operation. When the load current is rapidly changing in the transitional state, the switching power supply apparatus conducts an optimal transitional response operation. Hereafter, respective operations will be described.

First, the current program type pulse width modulation operation conducted when the load current is larger than a preset value, in the steady state will now be described.

The asynchronous flash analog-digital converter 1-1 compares the output voltage with the reference voltage $V_{ref}$, and generates the digital error signal e[n]. The digital error signal e[n] is supplied to the mode detector 2. When the absolute value of the digital error signal e[n] is small, for example, when $|e[n]| \leq 1$, the first mode switch 4 (sw1) and the second mode switch 9 (sw2) are set to a position 1 side. At this time, the load current is determined to be in the steady state, and the current program type pulse width modulation operation, which is the first operation state, or the pulse frequency modulation operation, which is the second operation state, is conducted. In both operation states, the digital error signal e[n] is supplied to the error multiplier 3. The error multiplier 3 forms an error compensation calculator in conjunction with an analog-digital converter which includes the successive approximation DA converter 5. The error compensation calculator calculates the peak current digital signal $i_c[n]$ according to Equation (1).

$$i_c[n]=i_c[n-1]+Ke[n] \quad (1)$$

The calculated peak current digital signal $i_c[n]$ is converted to the peak current analog signal $R_c i_c(t)$. The peak current analog signal $R_c i_c(t)$ is compared with the inductor current analog signal $R_s i_L(t)$. When the inductor current analog signal $R_s i_L(t)$ output from the inductor current detection circuit has become greater than the peak current analog signal $R_c i_c(t)$, the SR latch 12 is reset. The SR latch 12 receives the clock signal from the clock generator 13. The SR latch 12 is set at the beginning of each switching cycle to generate a pulse-width-modulated control signal c(t).

The pulse frequency modulation operation which is the second operation state will now be described.

The pulse frequency modulation operation is nearly the same as the pulse width modulation operation which is the first operation state. If the calculated peak current signal $i_c[n]$ has become less than a predetermined PFM current threshold $i_{pfm}[n]$, then the clock generator 13 is brought into the stop state and the output of the successive approximation DA converter 5 is set to a fixed value which is lower than the ripple current of the inductor. Furthermore, upon receiving an output signal of the asynchronous flash analog-digital converter 1-1, which is not illustrated, the SR latch 12 sets its output signal c(t).

The control form of the output voltage is an improved hysteresis mode of some kind. When a deviation between the output voltage and a preset value, i.e., the error signal e[n] has exceeded 1, the asynchronous flash analog-digital converter 1-1 activates the SR latch 12. Thereupon, the first switching element Q1 is brought into the conduction state, and the inductor current increases. As a result, the output voltage rises. When the inductor current has reached a fixed value which is set in the successive approximation DA converter 5, the SR switch 12 is inactivated and the first switching element Q1 is brought into the cutoff state. The output capacitance is discharged by the load current. When the error signal e[n] has exceeded 1 again, the next switching period is started.

Finally, the optimal load response operation which is the third operation state will be described.

The load variation is detected by the mode detector 2. Specifically, at the instant when the absolute value of the difference between the output voltage and the preset voltage exceeds unity, i.e., the relation $|e[n]| \geq 2$ is satisfied, the optimal load response operation is conducted. For example, at the instant when the transition from a light load state to a heavy load state is detected, the first switching element Q1 is brought into the conduction state. Conversely, if the load transition is occurring in the opposite direction, the first switching element Q1 is brought into the cutoff state. At that time, the first mode switch 4 (sw1) is set to a second state (a position 2 side) by the mode changeover signal m(t), and the peak/valley detector & optimal $\Delta i_c[n]$ calculator 1 is activated.

The peak/valley detector & optimal $\Delta i_c[n]$ calculator 1 calculates the optimal peak value of the inductor current according to a calculation technique based on the capacitor charge balance method. According to the calculation technique, the lost charge quantity can be restored most quickly until the optimal value in the steady state after the transitional response operation is reached. Furthermore, in the process, a rebound is not caused in the output voltage. Conventionally, however, there is a problem that the calculation precision of the calculation technique is influenced intensely by variation of the inductor included in the power circuit unit, variation of the capacitor, and a loss caused by parasitic elements. In the present embodiment, the change quantity of the inductor current with time during the transitional time period is corrected by using the inductor current sample and hold circuit 8.

Incidentally, operation of the capacitor charge balance method and the technique for correcting the influence of the variation of the inductor, the variation of the capacitor, and the loss caused by parasitic elements will be described below in detail with reference to a second embodiment.

Finally, effects of the present embodiment will be described with reference to an operation waveform diagram of an actual switching power supply apparatus configured based on the present embodiment.

Operation waveform diagrams in FIGS. 2 to 4 show measurement results of voltage stepdown operation for obtaining an output power supply of 1.5 V from an external power supply of 7.5 V in the present embodiment. Its operation frequency is 500 kHz.

FIG. 2 and FIG. 3 which is an expanded diagram of FIG. 2 show the optimal transitional response operation obtained when the load current has changed from 1.5 A to 4.5 A. FIG. 2 shows the output power supply voltage on the scale of 200 mV/division, the inductor current on the scale of 2 A/division, the current control reference value on the scale of 5 A/division, and the load current controlling a command signal on the scale of 10 V/division, in order from the top toward the bottom. The time axis of all of them has the scale of 20 μs/division. FIG. 3 is a diagram of the same waveforms obtained by expanding the time axis. FIG. 3 shows the output power supply voltage on the scale of 100 mV/division, the inductor current on the scale of 2 A/division, the current control reference value on the scale of 5 A/division, and the load current controlling a command signal on the scale of 10 V/division. The time axis of all of them has the scale of 5 μs/division. As appreciated from the waveform diagrams, the voltage of the output power supply returns to the steady state after the on/off operation is conducted only once, i.e. in the optimal time. According to the control mode in the present embodiment, it is possible to provide a voltage step-down power supply capable of having a transitional response that is very fast as compared with the conventional control mode, in this way.

FIG. 4 shows the steady state operation of the pulse frequency modulation in a control circuit configured based on a proposal of the present embodiment. FIG. 4 shows the output power supply voltage on the scale of 1 V/division, the inductor current on the scale of 2 A/division, and the switch element gate drive signal on the scale of 5 V/division in order from the top toward the bottom. The time axis of all of them has the scale of 5 μs/division. In this steady state operation of the pulse frequency modulation, the load current is 150 mA. When the first switch element Q1 is in the conduction state, the inductor current increases rapidly. Conversely, when the second switch element Q2 is in the conduction state, the inductor current decreases rapidly. For some time, both the first switch element Q1 and the second switch element Q2 are brought into the cutoff state and the inductor current becomes nearly zero. In other words, a discontinuous conduction mode (DCM) is brought about, and it is a mode, which is effective to reduce the power dissipation of the power supply circuit under the low load operation condition. The matter that poses a problem at this time is the stability of the voltage of the output power supply. It is appreciated that the output voltage is stable at 1.5 V as shown in FIG. 4. If the control circuit configured based on the present embodiment is used, then in this way it is possible to implement the pulse frequency modulation steady state operation with a smaller circuit scale as compared with the conventional mode and provide a voltage stepdown power supply dissipating low power at a lower cost.

In implementing the three functions, i.e., the pulse width modulation operation, the pulse frequency modulation operation and the optimal transitional response operation, virtually no additional elements for multi-mode operation are needed unlike the case of the conventional voltage controlled switching power supply apparatus. Therefore, a new increase of the manufacturing cost required for the control circuit can be minimized.

The conventional current controlled switching power supply apparatus has a problem that it is difficult to raise the speed of control for suppressing the voltage variation of the output power supply when the load has changed abruptly. This is because introduction of nonlinear control frequently used in the voltage controlled switching power supply apparatus is difficult in the current controlled switching power supply apparatus. Conventionally, therefore, means which switches the control mode to the voltage control mode when a variation is caused in output voltage by a sudden change of the load and returns the control mode to the current control mode again when the load has become stable is used. In this case, however, discontinuity occurs when the control mode is switched and the control becomes unstable. Furthermore, recently there is also a proposal of a current control mode utilizing the capacitor charge balance method in the same way as the present embodiment. However, the influence of the variation of the inductor, the variation of the capacitor, and the loss caused by parasitic elements appears remarkably, and consequently the voltage of the output power supply does not become stable.

According to the present embodiment, stable operation is demonstrated in peak current control, in the pulse width modulation operation, as well as in the pulse frequency modulation operation and the optimal transitional response operation. In addition, seamless transition between the control modes is achieved. The inductor current is detected and retained in each of the operation states, and it is used as an optimal peak current value in the next operation. Therefore, the control does not become discontinuous at the time of switching of the operation state. Furthermore, a function of correcting the influence of the variation of the inductor, the variation of the capacitor, and the loss caused by parasitic elements in the power circuit unit is provided in the operation for detecting and retaining the inductor current. According to the present embodiment, therefore, it is possible to provide a switching power supply apparatus in which the voltage is stable against an abrupt load variation.

Second Embodiment

A switching power supply apparatus (DC-DC converter) according to a second embodiment of the present invention will now be described with reference to the drawings.

Figure 5:
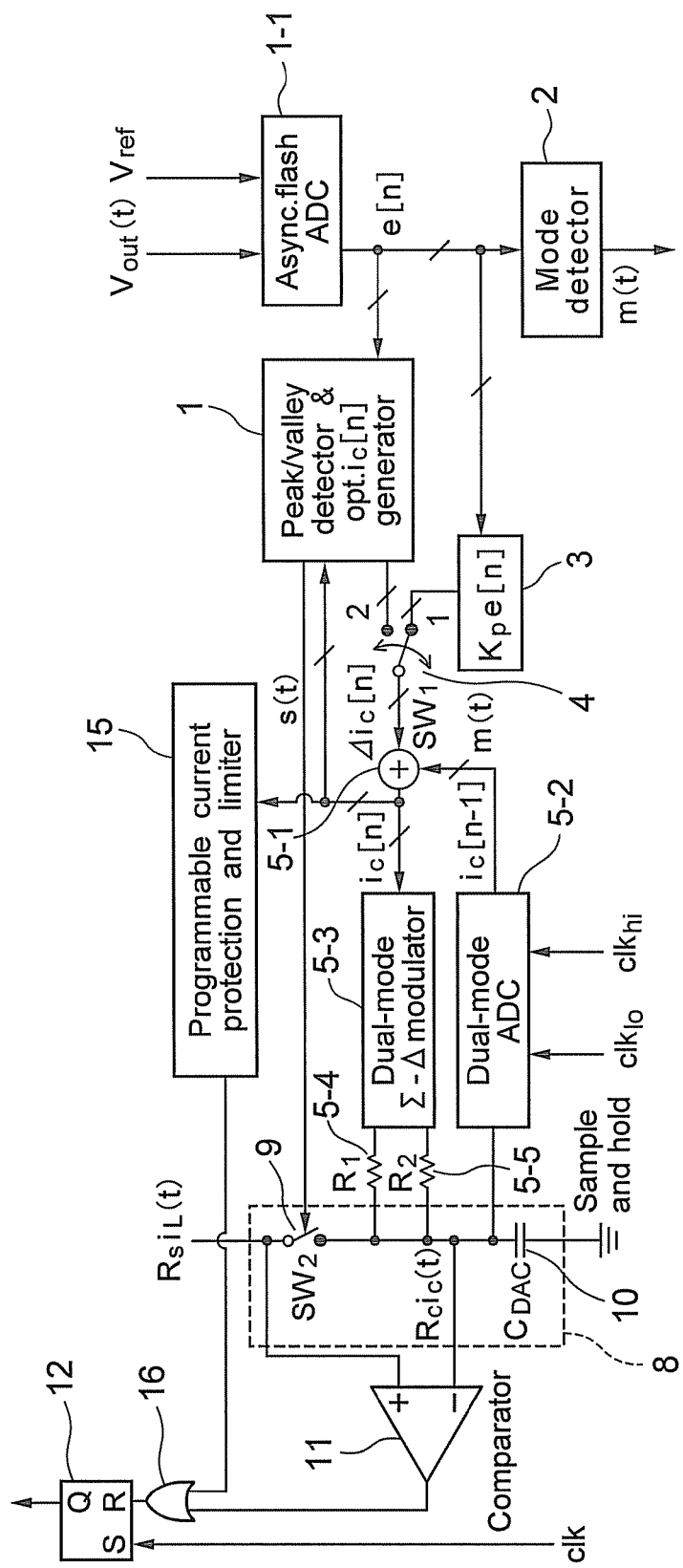
FIG. 5 is a block diagram showing the optimal response multi-mode digital current program mode control unit, which is the principal part of the switching power supply apparatus.
Figure 6:
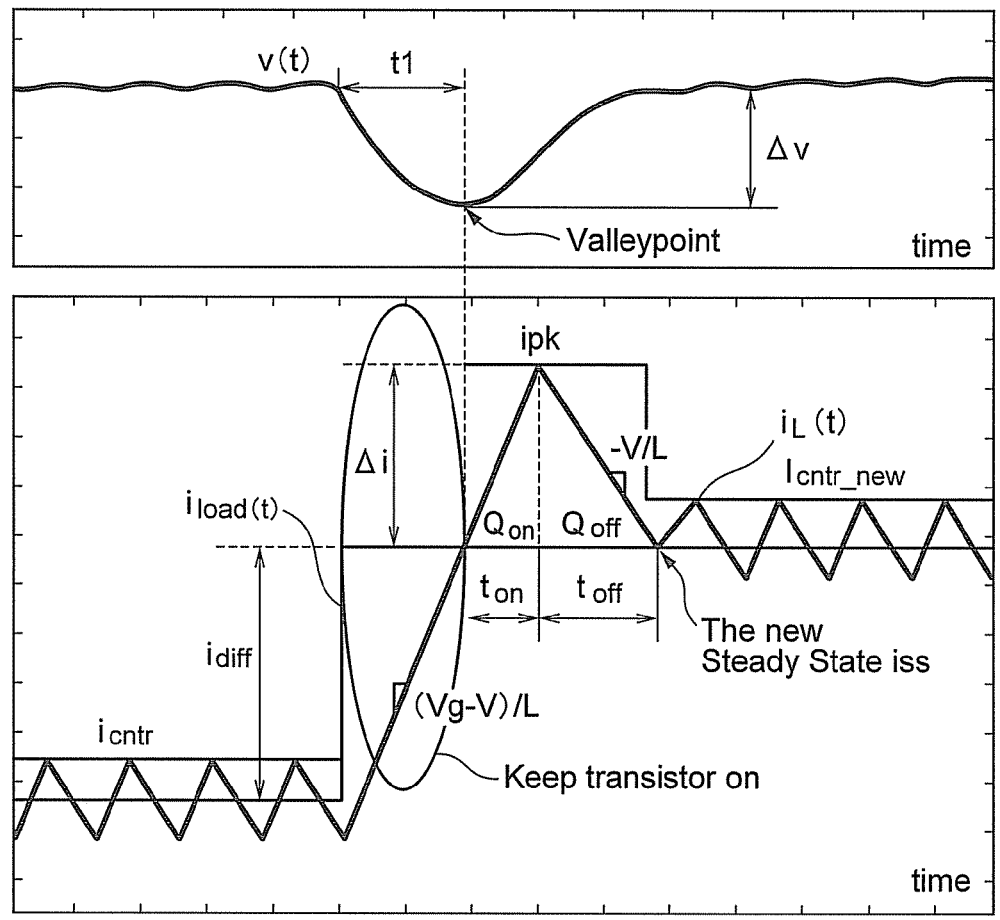
FIG. 6 is a waveform diagram for explaining operation of the switching power supply apparatus.
Figure 7:
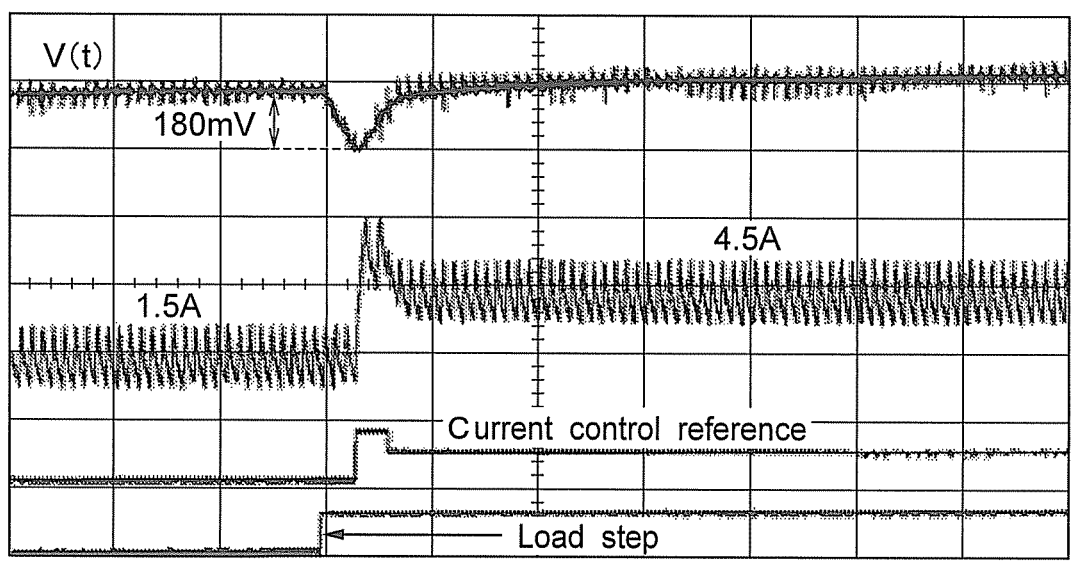
FIG. 7 is an operation waveform diagram of an actual switching power supply apparatus.

FIG. 5 is a block diagram showing the optimal response multi-mode digital current program mode control unit, which is the principal part of the switching power supply apparatus. FIG. 6 is a waveform diagram for explaining operation of the switching power supply apparatus. FIG. 7 is an operation waveform diagram of an actual switching power supply apparatus. The present embodiment provides an optimal response multi-mode digital current program mode controller having a self-aligned function, which is used in the DC power supply.

The optimal response multi-mode digital current program mode controller shown in FIG. 5 can form a switching power supply apparatus by combining it with the power circuit unit in the same way as the first embodiment. Its configuration is nearly the same as that in the first embodiment. Hereafter, therefore, the same components as those in the first embodiment are denoted by like characters and description thereof will not be repeated. Only different parts will be described.

The optimal response multi-mode digital current program mode controller shown in FIG. 5 is formed by adding a programmable current protection, a limiter 15, and a reset signal compounder 16 to the optimal response multi-mode digital current program mode controller in the switching power supply apparatus shown in FIG. 1. They are elements provided to prevent the inductor current from being saturated and elements from being destroyed. In the conventional optimal transitional response control mode based on the capacitor charge balance method, the on-time and off-time of the switch are calculated. Therefore, there is a problem that the on-time and the off-time are influenced by the inductor manufacturing dispersion, current saturation and parasitic resistance and its correction is very difficult. In addition, the inductor overcurrent protection and optimal transitional response control are contradicting functions, and it has been considered to reconcile them. According to the current program mode control circuit based on the present embodiment, the function concerning such current control can be implemented by adding a comparatively small number of circuit parts.

Hereafter, operation of the capacitor charge balance method implementing the optimal transitional response, which is a feature of the present embodiment and the technique for correcting the influence of the variation of the inductor, the variation of the capacitor, and the loss caused by parasitic elements will be described in detail with reference to an operation waveform diagram shown in FIG. 6.

FIG. 6 shows waveforms of the output voltage v(t) and inductor current $i_L(t)$ at the time of optimal transitional response operation when a transition from a small load current state to a large load current state is made. Besides the inductor current waveform $i_L(t)$, a reference value of the current control, i.e., a threshold is shown. Incidentally, it is a matter of course that a similar load response operation is also possible in the case where a transition from the large load current state to the small load current state is made.

At the instant when a load variation is detected, the first switching element Q1 is brought into the conduction state and an optimal transitional response control circuit is activated. The optimal transitional response control circuit sets a maximum transitional response current, which is denoted by $i_{pk}$ in FIG. 6 and sets a steady value after the transition, denoted by $i_{ctrl\_new}$ in FIG. 6. According to a feature of the capacitor charge balance method provided by the present embodiment, only the maximum transitional response current $i_{pk}$ is calculated and the steady value $i_{ctrl\_new}$ after the transition is measured and retained in the inductor current sample and hold circuit 8 shown in FIGS. 1 and 5 during the transition operation. At the instant when a minimum point (valley point), which assumes an extreme value (a minimum value) of the output voltage v(t) is detected as shown in FIG. 6. A sampling pulse signal having a short pulse width denoted by s(t) in FIGS. 1 and 5 is generated and the inductor current at timing of generation of the minimum point is captured by a capacitor $C_{DAC}$ 10 included in a filter. As shown in the waveform diagram of FIG. 6, the inductor current becomes the steady value $i_{ctrl\_new}$ after the transition. At the same time, the maximum transitional response current $i_{pk}$ is calculated from an optimal current difference Δi[n] according to Equation (2) as shown in the waveform diagram of FIG. 6.

$$i_{pk}[n]=i_{ctrl\_new}[n]+\Delta i[n] \qquad (2)$$

An output digital-analog converter 5-3 (Σ-ΔDAC) operates as a first-order sigma-delta modulator and a kind of RC filter circuit. In the steady state, an output analog-digital converter 5-2 (flash ADC) conducts sampling operation at a frequency, which is lower than the switching frequency in order to minimize the controller power dissipation, and only R1 in a first filter circuit resistor 5-4 is used. On the other hand, during a time period when the calculation of Equation (2) is executed, i.e. during load transients, operation frequencies of the output analog-digital converter 5-2 and the output digital-analog converter 5-3 are raised and the first filter circuit resistor 5-4 (R1) and the second filter circuit resistor 5-5 (R2) are connected in parallel. As a result, the cutoff frequency of the RC filter is raised. At the same time, the speed of the digital-analog conversion is raised and the maximum transitional response current ipk can be found before the inductor current iL actually assumes its value.

In the capacitor charge balance method according to the conventional art, instability caused in a shift from the optimal transitional response operation to the steady operation poses a great problem. This is caused by the fact that a technique of calculating the conduction time ton and the cutoff time toff of the first switching element as shown in FIG. 6 is used in the conventional capacitor charge balance method. The conduction time ton and cutoff time toff of the actual switching element deviate significantly from calculated values because they are influenced intensely by variations of the inductor and capacitor and the loss caused by the parasitic elements. On the other hand, according to the present embodiment, the inductor current steady value ictrl_new after the transition is acquired by a detector circuit. As a result, the problem of stability caused in the shift from the optimal transitional response operation to the steady operation is completely dissolved.

The reason why the present embodiment is stable under the influence of the variations of the inductor and the capacitor and the loss caused by the parasitic elements will now be described.

A capacitance charge balance algorithm is used to calculate the current difference $\Delta i$. Charge Q lost from the capacitor C, which has caused the voltage variation, must be replenished extra by the inductor current. In other words, Equation (3) holds true.

$$Q = C\Delta v = \frac{1}{2}\Delta i(t_{on} + t_{off}) \quad (3)$$

Here, relations between the optimal on-time ton and the optimal off-time toff of the switch and the current difference $\Delta i$ are given by Equation (4).

$$\Delta i = a_r t_{on} \text{ and } \Delta i = a_f t_{off} \quad (4)$$

Here, ar and af are rising and falling slopes of the inductor current, respectively. As for the current difference $\Delta i$, Equation (5) is derived by combining Equations (3) and (4). In Equation (5), $\Delta v$ represents a potential difference between the steady value and the minimum value of the output voltage.

$$\Delta i = \sqrt{\frac{2C\Delta v \cdot a_r a_f}{a_r + a_f}} \quad (5)$$

In an ideal lossless voltage stepdown power supply, the rising and falling slopes of the current become as shown in the operation waveform diagram in FIG. 6. Their relations are represented by Equation (6). In Equation (6), Vg represents a voltage of an external input power supply, and V represents the output voltage.

$$a_r = \frac{V_g - V}{L} \text{ and } a_f = \frac{V}{L} \quad (6)$$

Substituting Equation (6) into Equation (5) and rewriting, Equation (7) representing a current difference $\Delta i$ in the ideal voltage stepdown power supply is obtained. In Equation (7), D' represents 1−D (where D represents a duty ratio).

$$\Delta i = \sqrt{\frac{2CD'\Delta v}{L}} \quad (7)$$

However, Equation (7) holds true only when the voltage stepdown power supply can be regarded as a substantially ideal voltage stepdown power supply as in the case where the voltage of the output power supply is comparatively high and its load current is small. Otherwise, the result calculated supposing an ideal power supply deviates from the actual value largely, resulting in a response that cannot be said to be optimal.

On the other hand, in the control configuration according to the present embodiment, the inductor current settles down to a value in the optimal steady state without fail in the final stage of the on/off operation even if the voltage stepdown power supply is not optimal. This is because the current value in the latest steady state is found not from a calculation equation but by measuring, i.e. sampling, the actual inductor current at the point when a peak or the lowest point of the voltage is reached as described heretofore.

One of features of the present embodiment is that it has a self-aligning function of the circuit constants L and C. Owing to the function, characteristic degradation of the voltage stepdown circuit caused by the rising slope of the inductor current is compensated at the time of the transition from the low load state to the high load state. In other words, a principal action of the self-aligning function is to find the rising slope and the falling slope of the inductor current accurately.

In order to find the rising slope of the inductor current, the first on-time $t_{on}$ of the transistor is measured by a ring oscillators & digital logic circuit 1-2, which is a principal part of the present embodiment in the first transitional response. As for its method, the inductor current difference $\Delta i$ is set equal to an expected highest value $\Delta i_{init}$ and time required for the inductor current to reach the value is measured. The rising slope $a_r$ of the inductor current can be calculated from the obtained result according to Equation (8).

$$a_r = \frac{\Delta i_{init}}{t_{on}} \quad (8)$$

In the same way, the off-time of the switch or time required for the control circuit to return from the highest current value to the latest steady state current value is measured, and the falling slope of the inductor current is found according to Equation (9).

$$a_f = \frac{\Delta i_{init}}{t_{off}} \quad (9)$$

Owing to such manipulation, all parameters included in Equation (5), except the capacitor value, can be calculated. Finally, in order to find the capacitor value C, the difference between the output voltage and the preset value is measured at the time point of end of the first optimal transitional response operation. If the value is not zero, the capacitor value is corrected accordingly. In other words, owing to this process, all parameters in Equation (5) can be completely determined after the transitional response operation is conducted once. The parameters in the control circuit are adjusted into a state in which an optimal response can be obtained in both the current and the voltage, before the next load variation occurs.

Finally, effects of the present embodiment will now be described with reference to an operation waveform diagram of the actual switching power supply apparatus configured based on the present embodiment.

FIG. 7 is a diagram showing behavior of a current limiting function, which is a feature of the present embodiment. The operation waveform diagram in FIG. 7 shows measurement results of a voltage stepdown operation for obtaining an output power supply of 1.5 V from an external power supply of 7.5 V in the present embodiment. Its operation frequency is 500 kHz. FIG. 7 shows a voltage waveform of the output power supply on the scale of 200 mV/division, the inductor current on the scale of 2 A/division, the current control reference value on the scale of 5 A/division, and the load current controlling command signal on the scale of 10 V/division, in order from the top toward the bottom. The time axis of all of them has the scale of 20 μs/division. Incidentally, this current limiting function is implemented by the programmable current protection and limiter 15, as well as the reset signal compounder 16 shown in FIG. 15. Its role is to prevent the inductor current from being saturated. As for its operation, the first switch element Q1 is brought into the cutoff state for some time when a preset current limit is reached, and then the first switch element Q1 is brought into the conduction state again. As a result, control is exercised to prevent the inductor current from exceeding a maximum allowable current, and the control operation is repeated until the charge balance is achieved. According to the control mode based on the present embodiment, it is possible in this way to provide a voltage stepdown power supply capable of having a fast transitional response while providing a maximum allowable current limit.

Third Embodiment

Figure 8:
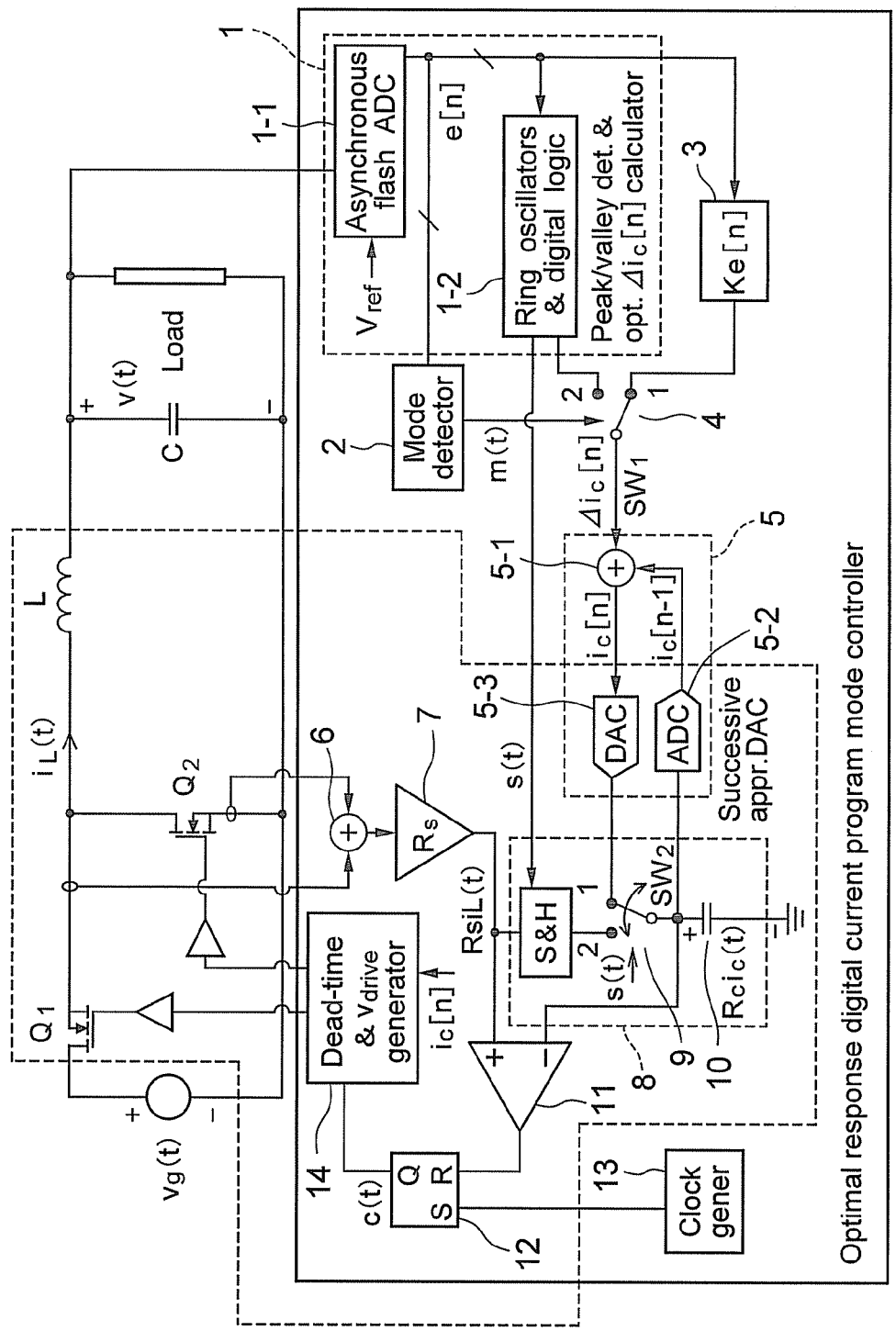
FIG. 8 is a block diagram showing a switching power supply apparatus according to the third embodiment of the present invention.
Figure 9:
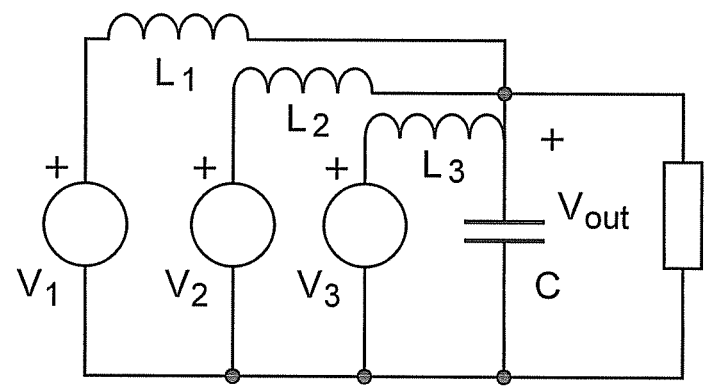
FIG. 9 is a diagram for explaining a problem of voltage control mode voltage step-down power supplies connected in parallel.
Figure 10:
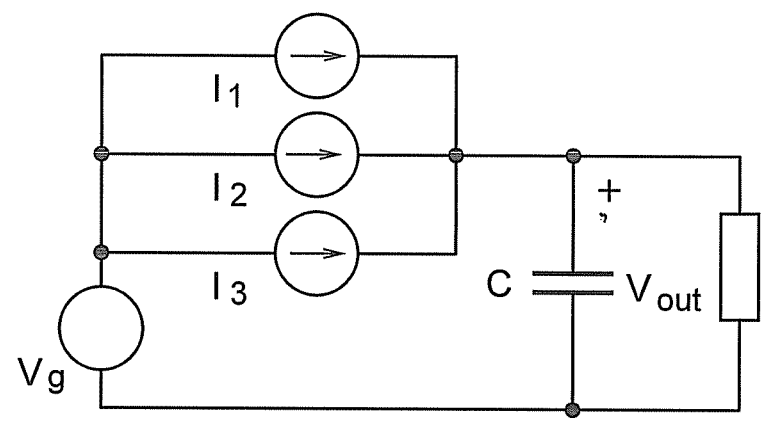
FIG. 10 is a concept diagram of current program mode voltage step-down power supplies connected in parallel according to the third embodiment of the present invention.

A switching power supply apparatus (DC-DC converter) according to a third embodiment of the present invention will now be described with reference to the drawings. FIG. 8 is a block diagram showing a switching power supply apparatus according to the third embodiment of the present invention. FIG. 9 is a diagram for explaining a problem of voltage control mode voltage stepdown power supplies connected in parallel. FIG. 10 is a concept diagram of current program mode voltage stepdown power supplies connected in parallel according to the third embodiment of the present invention.

The present embodiment is a DC high voltage power supply obtained by connecting a plurality of DC voltage stepdown power supplies operated by an optimal response multi-mode digital current program mode control unit having a self-aligning function, in parallel. It is attempted to obtain a large supply current by connecting plurality of DC voltage stepdown power supplies in parallel in this way and using small-sized elements, especially small inductors.

The switching power supply apparatus shown in FIG. 8 has a configuration, which is nearly the same as that of the first embodiment. The same components as those in the first embodiment are denoted by like characters, and description of them will not be repeated and only different parts will be described. In FIG. 8, a plurality of systems of a first switching element Q1, a second switching element Q2 and an inductor L in the power circuit unit, which are elements surrounded by a dashed line, are prepared, and a common output power supply v(t) is generated from a common external input power supply $v_g(t)$. In the same way, a plurality of systems of a successive approximation DA converter 5, an inductor current adder 6, the inductor current amplifier 7, an inductor current sample and hold circuit 8, a second mode switch 9, an optimal current value retaining capacitor 10, a differential amplifier 11, an SR latch 12, and a dead time & $V_{drive}$ generator 14 included in an optimal response multi-mode digital current program mode control unit, which are elements surrounded by a dashed line in FIG. 8 are prepared. The inductor current in each of the power circuit units is observed, and the first switching element Q1 and the second switching element Q2 are driven. Other elements, i.e., a peak/valley detector & optimal $\Delta i_c[n]$ calculator 1, a mode detector 2, an error multiplier 3, a first mode switch 4, and a clock generator 13 are prepared by ones, and are used in common.

In the conventional switching power supply apparatus of the voltage feedback control mode, it is basically difficult to implement a multi-phase operation in which a plurality of power supply circuits are connected in parallel and caused to operate. This is because when the switching power supply apparatuses of the voltage feedback control mode are connected in parallel as shown in FIG. 9 a phenomenon that current concentrate into a switching power supply apparatus of one system is brought about by differences among components, for example, differences among inductors $L_1$, $L_2$ and $L_3$ or slight differences among reference potentials $V_1$, $V_2$ and $V_3$ caused thereby. If this phenomenon occurs, then expected characteristics are not obtained, besides there is a danger that an element might be destroyed by the concentrated currents. On the other hand, in the switching power supply apparatus of the current feedback control mode, it is comparatively easy to implement the multi-phase operation in which a plurality of power supply circuits are connected in parallel and caused to operate. This is because it is possible to uniformly distribute the currents $I_1$, $I_2$ and $I_3$, which flow through the inductors by current feedback control and prevent current concentration. However, there has been no example in which multi-phase optimal transitional response operation is implemented by the current feedback control until now. This is because the calculation error of the peak current preset value is so large and time consuming as to be unallowable in the optimal transitional response operation.

In the present embodiment, multi-phase implementation inclusive of the transitional response operation is implemented by individually detecting and storing the inductor currents and averaging them. According to the present embodiment, therefore, a large supply current can be obtained with small-sized elements, especially small inductors by connecting a plurality of DC power supplies in parallel. Therefore, it is possible to reduce the size and cost of the power supply apparatus.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A switching power supply apparatus comprising:
    a power circuit unit, the power circuit unit comprising a first switching element connected at a first end to a first end of a power supply, an inductor connected at a first end thereof to a second end of the first switching element, a first output terminal connected to a second end of the inductor, a second output terminal connected to a second end of the power supply, a capacitor connected between the first output terminal and the second output terminal, and a second switching element connected between the second end of the power supply and a second end of the first switching element; and an optimal response multi-mode digital current program mode control unit, the optimal response multi-mode digital current program mode control unit comprising an error signal generator which generates an error signal according to a potential difference between an output voltage and a preset voltage, an inductor current detector which detects and amplifies an inductor current, a mode detector which detects an abrupt change of the output voltage and switches an operation mode;

a peak/valley detector & optimal current difference calculator which detects an extreme value of the output voltage and calculates a charge quantity lost by the capacitor; and an inductor current detection storage circuit which detects and stores an inductor current obtained when an extreme value of the output voltage is detected, and on-off control of the first switching element or the second switching element being exercised according to control of the mode detector, the peak/valley detector & optimal current difference calculator, and the inductor current detection storage circuit.

2. The switching power supply apparatus according to claim 1, wherein the power circuit unit is provided in plural sets, and wherein the inductor current detection storage circuit and the on-off control share the single optimal response multi-node digital current program mode control unit.

3. The switching power supply apparatus according to claim 1, further comprising a programmable current protection and limiter which detects that the inductor current has exceeded a preset value and which switches the on-off state of the first switching element and the second switching element temporarily.

4. The switching power supply apparatus according to claim 1, wherein the extreme value is a minimum or maximum value.

5. The switching power supply apparatus according to claim 1, wherein the first switching element and the second switching element are MOS transistors.

6. A switching power supply control apparatus which controls a first switching element connected at a first terminal thereof to a high potential terminal of an external input power supply and a second switching element connected at a first terminal thereof to a low potential terminal of the external input power supply and connected at a second terminal thereof to a second terminal of the first switching element, the switching power supply apparatus comprising an optimal response multi-mode digital current program mode control unit, the optimal response multi-mode digital current program mode control unit comprising an error signal generator which generates an error signal according to a potential difference between an output voltage and a preset voltage, and an inductor current detector which detects and amplifies an inductor current, wherein when a potential difference between the output voltage and the preset voltage has exceeded a predetermined voltage value, the first switching element is turned on, an optimal peak current value is calculated from an inductor current value at timing of the output voltage assuming an extreme value, and when the inductor current has reached the optimal peak current value, the first switching element is turned off.

7. The switching power supply control apparatus according to claim 6, wherein the first switching element, the second switching element and inductor current detector are provided in plural sets, and wherein the plurality of the inductor current detectors share the single optimal response multi-node digital current program mode control unit.

8. The switching power supply control apparatus according to claim 6, wherein the extreme value is a minimum of maximum value, depending on the type of load transition.

9. A switching power supply control apparatus which controls a first switching element connected at a first terminal thereof to a high potential terminal of an external input power supply and a second switching element connected at a first terminal thereof to a low potential terminal of the external input power supply and connected at a second terminal thereof to a second terminal of the first switching element, the switching power supply apparatus comprising an optimal response multi-mode digital current program mode control unit, the optimal response multi-mode digital current program mode control unit comprising an error signal generator which generates an error signal according to a potential difference between an output voltage and a preset voltage, and an inductor current detector which detects and amplifies an inductor current, wherein when a potential difference between the output voltage and the preset voltage has exceeded a predetermined voltage value, the first switching element is turned on, an optimal peak current value is calculated from an inductor current value at timing of the output voltage assuming an extreme value and the potential difference between the extreme value of the output voltage and the preset voltage, and when the inductor current has reached the optimal peak current value, the first switching element is turned off.

10. The switching power supply control apparatus according to claim 9, wherein the first switching element, the second switching element and inductor current detector are provided in plural sets, and wherein the plurality of the inductor current detectors share the single optimal response multi-node digital current program mode control unit.

11. The switching power supply control apparatus according to claim 9, wherein the extreme value is a minimum or maximum value, depending on the type of the load transient.

12. A switching power supply control apparatus which controls a first switching element connected at a first terminal thereof to a high potential terminal of an external input power supply and a second switching element connected at a first terminal thereof to a low potential terminal of the external input power supply and connected at a second terminal thereof to a second terminal of the first switching element, and which has a current program mode for steady load state and an optimum load response mode, the switching power supply apparatus comprising an optimal response multi-mode digital current program mode control unit, the optimal response multi-mode digital current program mode control unit comprising an error signal generator which generates an error signal according to a potential difference between an output voltage and a preset voltage, and an inductor current detector which detects and amplifies an inductor current, wherein when a potential difference between the output voltage and the preset voltage has exceeded a predetermined voltage value, a transition from the current program mode to the optimal load response mode is conducted and the first switching element is turned on, an inductor current value at timing of the output voltage assuming an extreme value is retained as a steady peak current value, at the same time, an optimal peak current value is calculated from the inductor current value and the potential difference between the extreme value of the output voltage and the preset voltage, when the inductor current has reached the optimal peak current value, the first switching element is turned off, and at timing of the output voltage returning to the preset voltage, transition to the current program mode having the steady peak current value as a preset current is conducted.

13. The switching power supply control apparatus according to claim 12, which controls plural sets of the first switching element, then second switching element, wherein the plural inductor current detectors share the single optimal response multi-node digital current program mode control unit.

14. The switching power supply control apparatus according to claim 12, wherein the extreme value is a minimum value.

15. A switching power supply apparatus comprising:

a power circuit unit, the power circuit unit comprising a first switching element connected at a first end to a first end of a power supply, an inductor connected at a first end thereof to a second end of the first switching element, a first output terminal connected to a second end of the inductor, a second output terminal connected to a second end of the power supply, a capacitor connected between the first output terminal and the second output terminal, and a second switching element connected between the second end of the power supply and a second end of the first switching element; and an optimal response multi-mode digital current program mode control unit, wherein the optimal response multi-mode digital current program mode control unit comprises:

a peak/valley detector & optimal current difference calculator which detects a potential difference between the first output terminal and the second output terminal, detects that the potential difference has reached an extreme value, generates a peak/valley detection signal, and calculates an optimal peak current difference;

a mode detector which detects that an error signal indicating a difference between a potential difference obtained between the first output terminal and the second output terminal and a preset voltage is greater than a certain preset value and generates a mode switching signal;

an error multiplier which outputs a signal obtained by amplifying the error signal;

a first mode switch which selects either an output of the error multiplier or an output of the peak/valley detector & optimal current difference calculator according to the mode switching signal, and outputs the selected result as a latest optimal peak current difference signal;

a successive approximation DA converter which adds the optimal peak current difference signal and the optimal peak current signal of last time together, and thereby calculates the latest optimal peak current signal;

an inductor current detector which obtains an inductor current signal by amplifying the inductor current;

a sample and hold circuit which takes in and retains the inductor current signal according to the peak/valley detection signal;

a second mode switch which selects and retains either the inductor current signal output by the sample and hold circuit or an output signal of the successive approximation DA converter according to the peak/valley detection signal, and outputs the latest optimal peak current value;

an optimal current value retaining capacitor which stores the latest optimal peak current value to make it possible for the successive approximation DA converter to find an optimal peak current value of last time in next cycle operation;

a differential amplifier which is supplied at a non-inverting input terminal thereof with the inductor current signal and supplied at an inverting input terminal thereof with the latest optimal peak current value, which comprises the inductor current signal with the latest optimal peak current value, amplifies a difference between the inductor current signal and the latest optimal peak current value, and generates a reset signal;

an SR latch which is supplied at a reset terminal thereof with the reset signal and supplied at a set terminal thereof with a clock signal, and which generates a switching element control signal; and a drive circuit which is supplied with the switching element control signal and which exercises on/off control on the first switching element and the second switching element.

16. The switching power supply apparatus according to claim 15, wherein the power circuit unit is provided in plural sets, and wherein the successive approximation DA converter, the inductor current detector, the sample and hold circuit, the second mode switch, the optimal current value retaining capacitor, the differential amplifier, the SR latch and the drive circuit share the single optimal response multi-node digital current program mode control unit.

17. The switching power supply apparatus according to claim 15, wherein the extreme value is a minimum or maximum value, depending on the type of the load transient.

18. The switching power supply apparatus according to claim 15, wherein the first switching element and the second switching element are MOS transistors.

* * * * *